United States Patent
Nicholson et al.

(10) Patent No.: US 8,982,452 B2
(45) Date of Patent: Mar. 17, 2015

(54) ALL-IN-ONE RAMAN FIBER LASER

(75) Inventors: Jeffrey W. Nicholson, Warren, NJ (US); Thierry F. Taunay, Bridgewater, NJ (US)

(73) Assignee: OFS Fitel, LLC, Norcross, GA (US)

(*) Notice: Subject to any disclaimer, the term of this patent is extended or adjusted under 35 U.S.C. 154(b) by 182 days.

(21) Appl. No.: 13/546,961

(22) Filed: Jul. 11, 2012

(65) Prior Publication Data

US 2013/0188243 A1    Jul. 25, 2013

Related U.S. Application Data

(63) Continuation-in-part of application No. 12/778,012, filed on May 11, 2010, now Pat. No. 8,351,111, and a continuation-in-part of application No. 12/778,025, filed on May 11, 2010, now abandoned.

(60) Provisional application No. 61/506,624, filed on Jul. 11, 2011, provisional application No. 61/177,058, filed on May 11, 2009.

(51) Int. Cl.
*H01S 3/30* (2006.01)
*H04B 10/17* (2006.01)
*H01S 3/08* (2006.01)
*H01S 3/082* (2006.01)
*H01S 3/067* (2006.01)
*H01S 3/07* (2006.01)
*H01S 3/094* (2006.01)
*H01S 3/0941* (2006.01)
*H01S 3/16* (2006.01)
*H01S 3/00* (2006.01)
*H01S 3/23* (2006.01)

(52) U.S. Cl.
CPC ......... *H01S 3/08013* (2013.01); *H01S 3/06708* (2013.01); *H01S 3/06733* (2013.01); *H01S 3/0675* (2013.01); *H01S 3/07* (2013.01); *H01S 3/094007* (2013.01); *H01S 3/094042* (2013.01); *H01S 3/094046* (2013.01); *H01S 3/09408* (2013.01); *H01S 3/094084* (2013.01); *H01S 3/09415* (2013.01); *H01S 3/1608* (2013.01); *H01S 3/1618* (2013.01); *H01S 3/302* (2013.01); *H01S 3/0064* (2013.01); *H01S 3/0078* (2013.01); *H01S 3/0826* (2013.01); *H01S 3/2375* (2013.01)
USPC ........................................ 359/334; 359/341.1

(58) Field of Classification Search
USPC .................................... 359/334, 341.1, 341.3
See application file for complete search history.

(56) References Cited

U.S. PATENT DOCUMENTS

| | | | | |
|---|---|---|---|---|
| 6,324,326 | B1 * | 11/2001 | Dejneka et al. | 385/123 |
| 6,389,186 | B1 * | 5/2002 | DiGiovanni et al. | 385/12 |
| 6,407,855 | B1 * | 6/2002 | MacCormack et al. | 359/346 |
| 6,701,044 | B2 * | 3/2004 | Arbore et al. | 385/37 |
| 6,721,088 | B2 * | 4/2004 | Brar et al. | 359/334 |
| 7,095,552 | B2 * | 8/2006 | Hwang et al. | 359/334 |
| 2003/0215241 | A1 * | 11/2003 | Hwang et al. | 398/92 |
| 2008/0180787 | A1 * | 7/2008 | DiGiovanni et al. | 359/334 |

* cited by examiner

*Primary Examiner* — Eric Bolda
(74) *Attorney, Agent, or Firm* — Jacobs & Kim LLP

(57) ABSTRACT

A low-power "all-in-one" Yb/Raman optical fiber laser system includes a pump input, and a Yb/Raman resonator including a segment of integrated Yb/Raman fiber configured to provide both a ionic gain and Raman gain. A set of input gratings and output gratings define a series of reflector pairs that, together with the integrated Yb/Raman fiber, create a nested series of cavities that provide a stepwise transition from the input wavelength to a selected target output wavelength.

16 Claims, 13 Drawing Sheets

350 (cont'd)

353: CONNECT A DIRECTIONAL COUPLER BETWEEN THE OSCILLATOR AND AMPLIFIER, WHEREBY THE OSCILLATOR IS OPTICALLY ISOLATED FROM THE AMPLIFIER AND RESONATOR, AND WHEREBY THE OSCILLATOR IS OPERABLE WITHIN A FIRST POWER LEVEL RANGE, AND THE AMPLIFIER AND OSCILLATOR ARE OPERABLE WITHIN A SECOND POWER LEVEL RANGE EXCEEDING THE FIRST POWER LEVEL RANGE.

354: USE THE FILTER FIBER AND THE PUMPING ENERGY SOURCE TO AMPLIFY THE OSCILLATOR OUTPUT AND TO CREATE A LASER OUTPUT AT A SELECTED TARGET WAVELENGTH.

FIG. 8B

ALL-IN-ONE RAMAN FIBER LASER

CROSS REFERENCE TO RELATED APPLICATION

The present application claims the priority benefit of U.S. Prov. Patent App. Ser. No. 61/506,624, filed on Jul. 11, 2011.

The present application is a continuation-in-part of U.S. patent application Ser. No. 12/778,012, filed on May 11, 2010, which claims the priority benefit of U.S. Prov. Patent App. Ser. No. 61/177,058, filed on May 11, 2009.

The present application is also a continuation-in-part of U.S. patent application Ser. No. 12/778,025, filed on May 11, 2010, which also claims the priority benefit of U.S. Prov. Patent App. Ser. No. 61/177,058, filed on May 11, 2009.

All of the above applications are owned by the assignee of the present application, and are incorporated by reference herein in their entirety.

BACKGROUND OF THE INVENTION

1. Field of the Invention

The present invention relates generally to optical fiber devices and methods, and in particular to an improved all-in-one Raman fiber laser.

2. Background Art

Cascaded Raman fiber lasers (CRFLs) are useful devices for generating laser outputs at wavelengths at which rare-earth ionic gain is not available. A CRFL provides a stepwise transition from a starting wavelength to a selected target wavelength. The stepwise transition is created through cascaded lasing of one or multiple Raman orders in a suitable Raman gain medium. A nested series of Raman cavities are created in the gain medium by, for example, a corresponding nested series of in-line reflective grating pairs. Each successive cavity in the series is separated in wavelength from the preceding cavity by the respective Raman Stokes shift introduced by Raman scattering in the preceding cavity. A CRFL is typically pumped using a continuous-wave (CW) laser, such as a cladding-pumped Yb-doped fiber laser.

Raman fiber lasers are useful in a number of different applications, both at higher powers (e.g., greater than 20 W) and at lower powers (e.g., less than 10 W). However, because of their relative complexity, prior art Raman fiber lasers have a relatively high manufacturing cost. It is believed that, the cost issue is one reason that Raman fiber laser technology has not reached its full potential in the optical communications market.

SUMMARY OF THE INVENTION

Aspects of the present invention are directed to a low-power Yb/Raman optical fiber laser system with a reduced component count. The laser system includes a resonator and a pump source for launching a pump light at a selected input wavelength into the resonator. The resonator comprises a length of integrated Yb/Raman optical fiber configured to provide both ionic gain and Raman gain. A set of input gratings is provided at an input portion of the fiber and a set of output gratings is provided at an output portion of the fiber. The input and output gratings define a series of reflector pairs that, together with the integrated Yb/Raman optical fiber, create a nested series of cavities that are configured to provide a stepwise transition from the input wavelength to a selected target output wavelength.

Further aspects of the invention are directed to an integrated Yb/Raman optical fiber suitable for use at low powers, and techniques for light generation and amplification employing the integrated Yb/Raman optical fiber.

BRIEF DESCRIPTION OF THE DRAWINGS

FIGS. 7 and 8A-B are a pair of flowcharts illustrating overall techniques according to various described aspects of the invention.

DETAILED DESCRIPTION

The present description is organized into two sections:

Section I is directed to systems and techniques according to aspects of the invention in which a cascaded Raman resonator (CRR) is pumped at high powers, e.g., on the order of greater than 20 W. Section I was previously presented in U.S. patent application Ser. No. 12/778,012, filed on May 11, 2010, of which the present application is a continuation-in-part.

Section II is directed to directed to systems and techniques according to aspects of the invention in which a cascaded Raman resonator (CRR) is pumped at high powers, e.g., on the order of less than 10 W.

Section I

Figure 1:
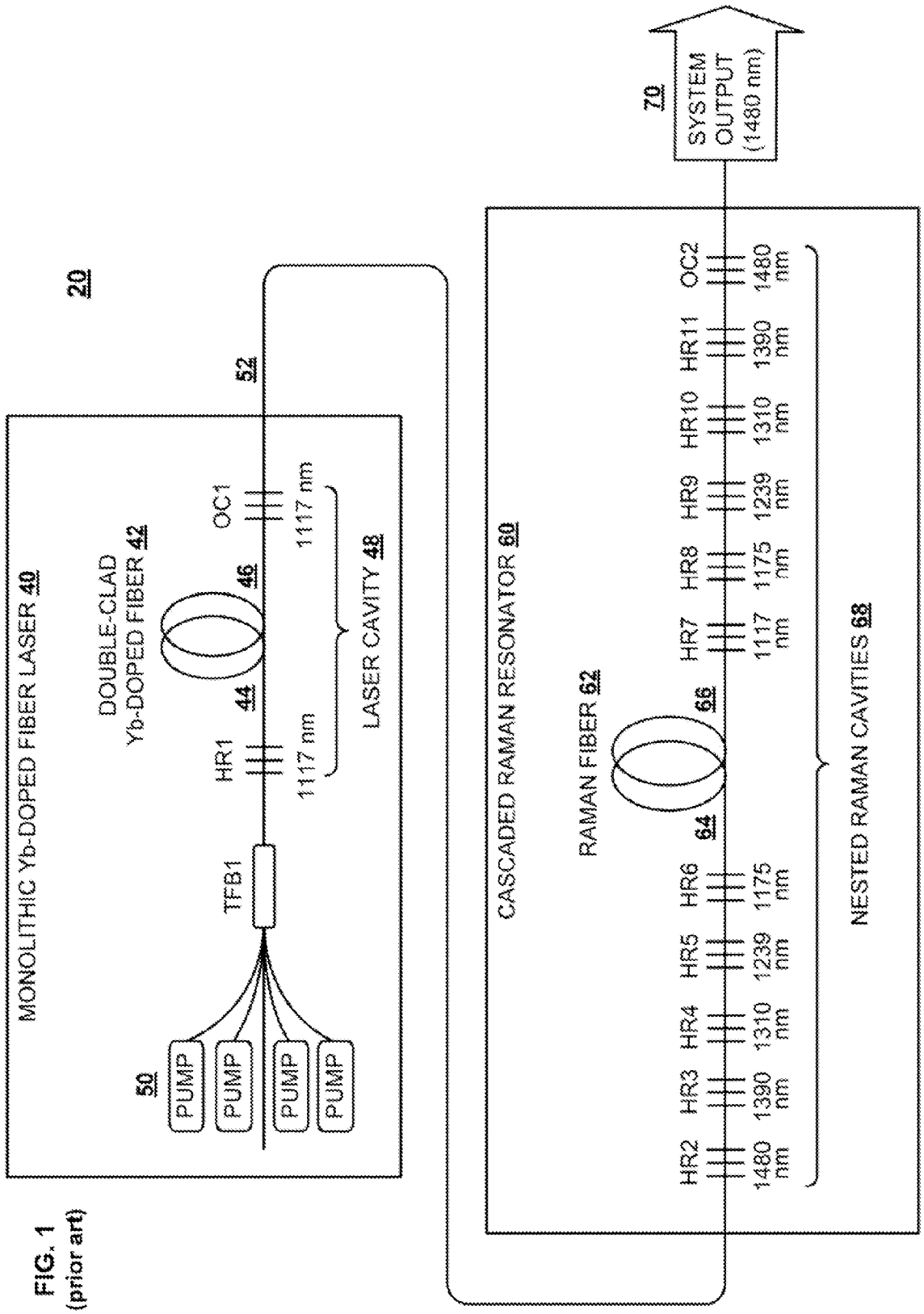
FIG. 1 is a diagram of a laser-pumped cascaded Raman resonator system according to the prior art.

FIG. 1 is a diagram of a current CRFL system configuration 20, in which a system output of 41 W of power at 1480 nm was demonstrated. The single-mode 1480 nm system output 70 is suitable for use as a high-power pump for core pumping of an erbium-doped fiber laser (EDFL) or an erbium-doped fiber amplifier (EDFA). As shown in FIG. 1, system 20 comprises two stages: a monolithic Yb-doped fiber laser 40 and a cascaded Raman resonator (CRR) 60.

In laser 40, the active gain medium is provided by a length of a double-clad Yb-doped fiber 42 operating in the region of 1000 nm to 1200 nm. A high reflector grating HR1 is provided at the input end 44 of fiber 42, and an output coupler grating OC1 is provided at the output end 46 of fiber 42. High reflector HR1, output coupler OC1, and fiber 42 function as a laser cavity 48. Pump power is provided to fiber 42 by a plurality of pumps 50, e.g., multimode 915 nm or 975 nm diode lasers, which are coupled to fiber 42 by means of a tapered fiber bundle TFB1. In the present example, the laser output 52 is single-mode radiation at a wavelength of 1117 nm.

The laser output 52 is used to launch a pump power input into the cascaded Raman resonator 60. Resonator 60 comprises a Raman-active fiber 62, having a small effective area and normal dispersion. The normal dispersion prevents modulation instability that would lead to supercontinuum generation at high powers. The small effective area leads to high Raman gain, and consequently multiple Stokes orders can be generated.

A first plurality of high reflector gratings HR2-HR6 are provided at the Raman fiber's input end 64, and a second plurality of high reflector gratings HR7-HR11 and an output coupler OC2 are provided at the Raman fiber's output end 66. An additional pump reflector recycles unused Yb radiation for increased efficiency. Input gratings HR2-HR6, output gratings HR7-HR11 and OC2, and Raman fiber 64 provide a nested series of Raman cavities 68. The respective wavelengths of each of the nested Raman cavities are configured to create a cascaded series of Stokes shifts over a broad range, increasing the wavelength of the 1117 nm laser output to a target wavelength of 1480 nm in a series of steps. Output coupler OC2 provides a system output 70 at a target wavelength of 1480 nm, which can then be used to pump an EDFA or EDFL in the fundamental mode.

The prior art system 20 suffers from a number of known drawbacks and limitations.

First, in increasing the output power to 41 W at 1480 nm, it was found that it was necessary to restrict the length of the Raman fiber 62 in resonator 60 in order to avoid unwanted Raman scattering to the next Stokes order, i.e., at 1590 nm.

Further, multiple reflectors at various wavelengths and positions in the system 20 combine to create coupled cavities. It will be seen that there are three reflectors at the laser wavelength of 1117 nm, i.e., gratings HR1, OC1 and HR7. In general this does not pose a problem for systems operating at relatively low power (e.g., 5 W output at 1480 nm). Recently, however, investigations have been undertaken with respect to power scaling of Raman fiber lasers. As mentioned above power levels as high as 41 W have been demonstrated from a CRR.

While high power has been demonstrated from such a system, the coupled cavity nature of the setup in FIG. 1 has serious implications on long-term reliable operation. In particular, the coupled cavity can cause the system to become unstable and generate pulses with sufficiently high peak power to damage components. The laser high reflector HR1 in particular has been found to be a weak link in the system, presumably due to the high power that propagates through it, and has been observed to fail under various conditions including, for example, using the system 20 to pump an erbium-doped fiber laser or amplifier. In addition, it is possible for light from intermediate Stokes orders generated in the Raman laser to propagate back into the Yb amplifier and back to the pump diodes, causing them to fail. Furthermore, light at the first Stokes shift is still within the gain bandwidth of Yb and is amplified before hitting the diodes. It will be apparent that this is also detrimental.

One possible solution is to use a master oscillator power amplifier (MOPA) configuration, in which the components of a monolithic high-power Yb fiber laser are separated into a low-power oscillator plus a high-power amplifier. The MOPA configuration allows the oscillator to be effectively isolated from the amplifier and cascaded Raman resonator using a suitable backward propagation prevention device, such as a fiber-coupled isolator or a filter wavelength division multiplexer (WDM), resulting in a system that is capable of reliable operation at 20 W continuous wave (CW) power. This approach is described in U.S. Provisional Patent Application Ser. No. 61/177,058, filed on May 11, 2009, which is owned by the assignee of the present application, and which is incorporated herein by reference in its entirety. One potential drawback of the MOPA approach, however, is the increased component count.

According to an aspect of the present invention, the above-described issues arising from the use of nested, coupled cavities are effectively eliminated through the use of a system configuration in which cascaded Raman amplification is provided by a single-cavity laser based on a specially designed Yb-doped filter fiber. In the presently described "all-in-one" single-cavity design, a cascaded Raman resonator and a pump power source are consolidated into a single structure. In this approach, ionic gain is provided by dopant ions, while non-linear gain is provided at longer wavelengths via Raman scattering. A series of in-line pairs of input and output gratings provide feedback, with the respective wavelength of each successive grating pair in the series separated from the wavelength of the previous grating pair by an amount that approximates the respective Stokes shift. Compared with other approaches, the "all-in-one" cavity configuration described herein provides a simpler setup, with less fiber, and with a lower component count.

Figure 2:
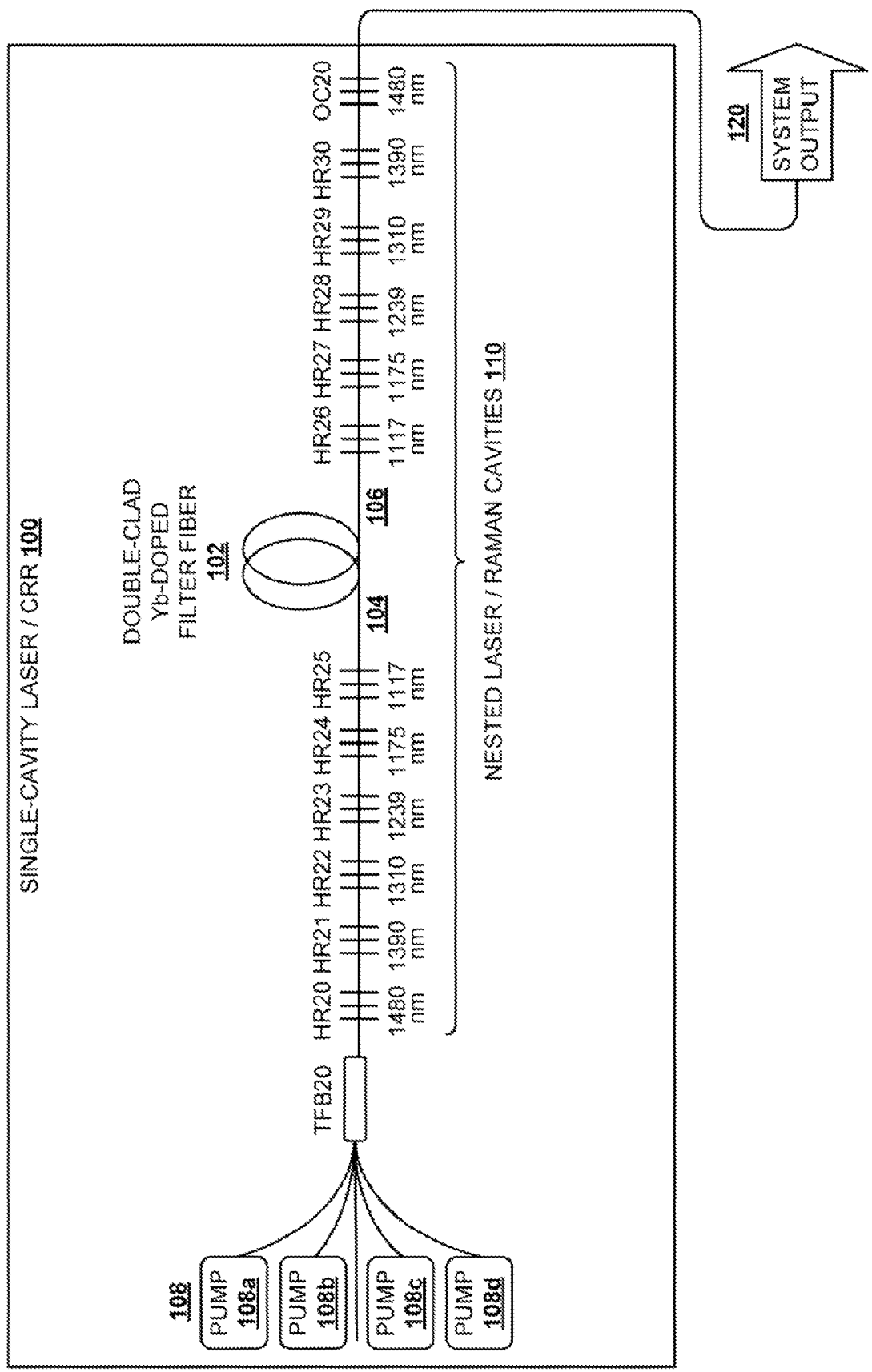
FIG. 2 is a diagram of an exemplary cascaded Raman resonator system according to a first aspect of the invention.

FIG. 2 shows a diagram of an exemplary system 100 according to the present invention. The system 100 includes a length of a filter fiber 102 that is suitable for providing both ionic gain and Raman gain to light propagating therethrough. In the present example, filter fiber 102 is a specially designed Yb-doped double-clad filter fiber having a W-shaped refractive index profile that suppresses unwanted Stokes orders at wavelengths longer than a selected target wavelength, and having normal dispersion over its operating bandwidth. This fiber is described in U.S. Provisional Patent Application Ser. No. 61/177,058, filed on May 11, 2009, which is owned by the same assignee as the present application, and which is incorporated by reference herein in its entirety.

As described below, a system according to an aspect of the invention includes a nested series of Raman cavities, separated in wavelength by respective Stokes shifts. It is well known to those skilled in the art that Raman resonators may be constructed using alternative architectures and wavelength selective elements, such as use of fused fiber couplers or thin-film filters to construct WDM loop mirrors. In addition, linear, unidirectional ring or bidirectional ring cavity geometries can be considered. Furthermore, FIG. 2 shows the cascaded Raman resonator configured to operate as a laser, but it equally well could be configured to operate as an amplifier by leaving off the final set of gratings and instead injecting a signal at that wavelength. The present discussion focuses on resonators constructed using Bragg grating reflectors for illustration purposes only.

For the purposes of the present discussion, the term "reflector" is used to generically refer to either a high reflector or an output coupler, or like device, and the term "reflectors" is used to generically refer to a plurality of high reflectors or output couplers, or like devices, or any combination thereof.

A first plurality of high reflectors HR20-HR25 are provided at the input end 104 of filter fiber 102, and a second plurality of high reflectors HR26-HR30 and an output coupler OC20 are provided at the output end 106 of filter fiber 102. In the present example, input high reflectors HR20-HR25, output high reflectors HR26-30 and output coupler OC20 are created using fiber Bragg gratings, or like devices, which are written in fiber segments separate from filter fiber 102 and then fusion-spliced to the filter fiber 102. It should be noted that it would also be possible to write the gratings directly into filter fiber 102.

System 100 further includes a pump power source 108, comprising one or more diode laser pumps 108a-d, or like devices. Pumps 108a-d are coupled to filter fiber 102 by means of a pump combiner, i.e., tapered fiber bundle TFB20, or other suitable device.

FIG. 2 shows exemplary wavelengths for reflectors HR20-HR30 and OC20. It is noted, however, that these wavelengths and the number of cavities are specific to the depicted system 100, and are provided for the purposes of the present discussion. It will be appreciated that the present invention may be practiced in systems having reflectors at other wavelengths. Also, the number and configuration of reflectors may be modified for a given application. It will also be appreciated that it is possible to modify the position of the input gratings HR20-HR25 with respect to the pump combiner TFB20. In FIG. 2 the input gratings HR20-HR25 are shown to the right of the pump combiner TFB20, with TFB20 external to the nested laser cavities. However, the input gratings HR20-HR25 could equally well be placed to the left of the pump combiner TFB20, with pump combiner TFB20 internal to the nested laser cavities.

In the exemplary system 100 shown in FIG. 2, reflectors HR10-HR20 and OC20 have respective wavelengths and positions such that they form a nested series of wavelength-matched reflector pairs, with a first reflector located at the filter fiber input end 104 and a second reflector located at the filter fiber input end 106. The first reflector pair in the nested series comprises high reflectors HR25 and HR26, each of which having a wavelength of 1117 nm. The series continues with the following pairs: HR24/HR27 at 1175 nm; HR23/HR28 at 1239 nm; HR22/HR29 at 1310 nm; HR21/HR30 at 1390 nm, and HR20/OC20 at 1480 nm. These pairs, and filter fiber 102, provide a nested series of Raman cavities 110, separated in wavelength by respective Stokes shifts.

Figure 3:
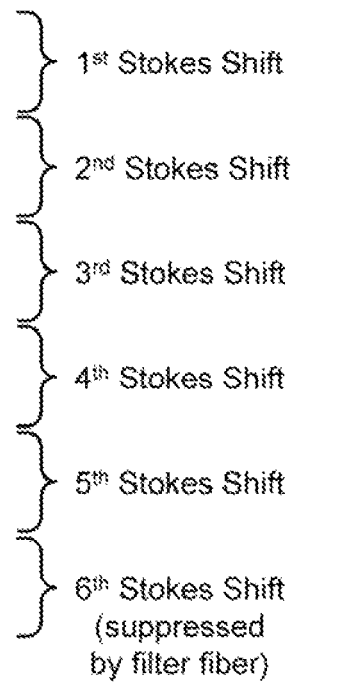
FIG. 3 is a table illustrating exemplary wavelengths and Stokes shifts for the cascaded Raman resonator shown in FIG. 2.

FIG. 3 is a table 130 setting forth the reflector wavelengths for the exemplary system 100 shown in FIG. 2. Further set forth in the FIG. 3 table 130 are the five Stokes shifts that take place. The sixth Stokes shift, to 1590 nm, is included in table 130 for the purposes of illustration. However, as discussed below, this Stokes shift (and any subsequent higher order Stokes shifts) is suppressed by filter fiber 102.

First reflector pair HR25/HR26 at 1117 nm, and filter fiber 102, provide a combined cavity that functions as both a laser cavity and a Raman cavity. Ionic gain is provided by Yb ions in filter fiber 102 between high reflectors HR25 and HR26. Once the power generated by the Yb-doped gain medium at 1117 nm exceeds the threshold for stimulated Raman scattering, light is created at the first Stokes shift, which in the present example is approximately 1175 nm.

The next reflector pair HR24/HR27 in the nested series has a wavelength corresponding to the first Stokes shift. Feedback from this grating pair at 1175 nm will lead to lasing at this wavelength. According to a further aspect of the invention, the first reflector pair is located inside the next reflector pairs, in order to minimize loss in the first cavity. The remaining reflector pairs HR23/HR28, HR22/HR29, and HR21/HR30 provide feedback, with the wavelengths of each grating pair in the series separated from the preceding pair in the series by an amount that approximates the respective Stokes shift in silica fibers. As power is increased, further cascading to longer wavelengths will continue until lasing at the target wavelength, i.e., 1480 nm, at the final grating pair HR20/OC20 is achieved. Thus, the described series of Stokes shifts provides a stepwise transition from the starting wavelength to the target wavelength.

Light at the target wavelength, i.e., 1480 nm, is potentially subject to further Raman gain. In order to prevent further cascading to unwanted longer wavelength Stokes orders, the Yb-doped gain medium has a refractive index profile based on a W-shaped depressed clad design in which the fundamental LP01 mode experiences a cutoff at wavelengths longer than the target wavelength. The design of such a filter fiber is described in U.S. Provisional Patent Application Ser. No. 61/177,058, filed on May 11, 2009, which is owned by the assignee of the present application, and which is incorporated herein by reference in its entirety.

Fibers with W-shaped index profiles with a fundamental mode cutoff have been used in the context of erbium S-band amplifier applications, and have also been used to suppress Raman scattering in high-power Yb-doped fiber amplifiers. However, those fibers are unsuitable for use in the context of high-power Raman lasers because, in both cases, the dispersion characteristics of the filter fiber over a broad wavelength range are not an important consideration. If the dispersion of the fiber in which Raman scattering occurs is anomalous, modulation instability will lead to supercontinuum generation rather than scattering to discrete Raman Stokes orders. A filter fiber designed for cascaded Raman scattering must therefore have normal dispersion throughout the wavelength region of operation.

The present discussion makes use of the dispersion parameter, D, which has units of ps/(nm-km). A negative value of D indicates normal dispersion, and a positive value of D indicates anomalous dispersion. In an anomalous dispersion regime, phenomena such as modulation instability and solution formation occur that are not present in a normal dispersion regime. A standard single-mode fiber has a zero-dispersion wavelength at approximately 1300 nm and anomalous dispersion at wavelengths longer than the zero-dispersion wavelength.

Figure 5:
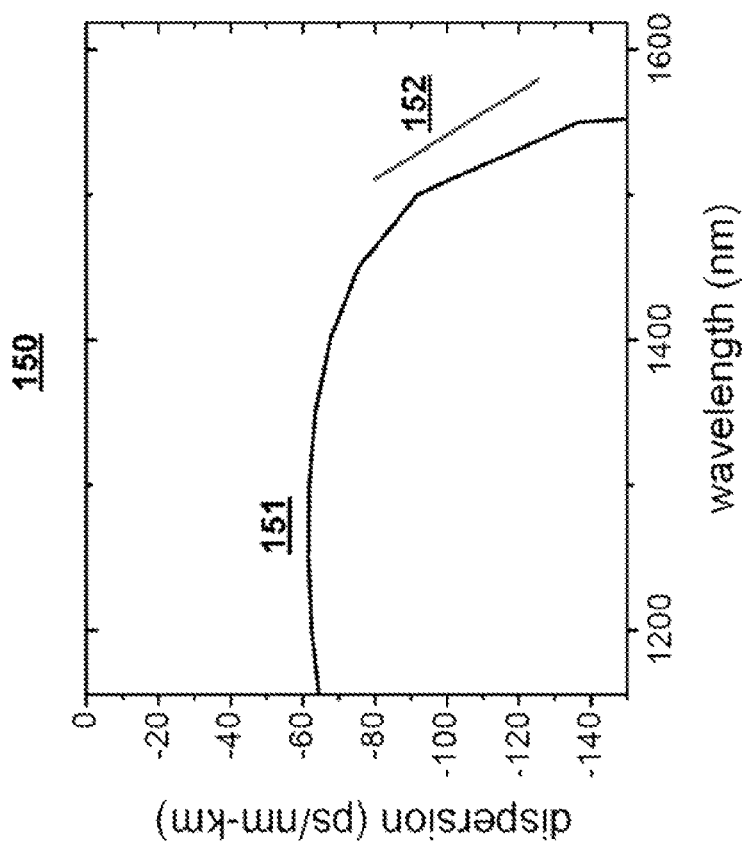
FIGS. 4 and 5 are a pair of graphs showing, respectively, measured loss and measured and calculated dispersion for a filter fiber designed for cascaded Raman scattering from 1000 nm to 1480 nm.
Figure 4:
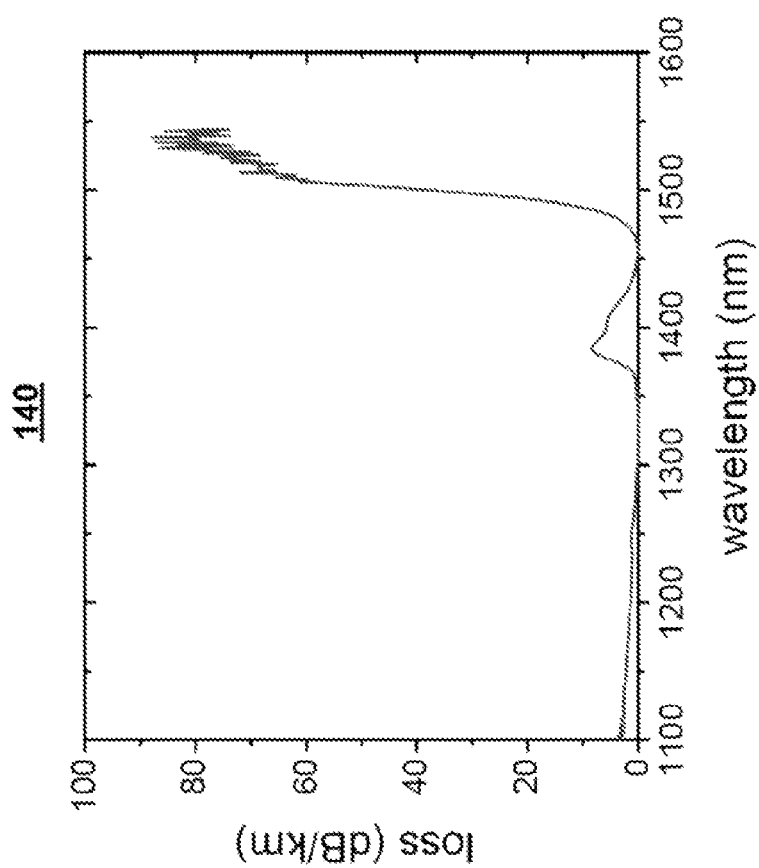

FIG. 4 is a graph 140 showing measured loss for a filter fiber designed for cascaded Raman scattering from 1000 nm to 1480 nm, while suppressing Stokes shifts at longer wavelengths. FIG. 5 is a graph 150 showing calculated dispersion 151 and measured dispersion 152 for the filter fiber. In the exemplary systems described herein, the W-shaped index profile that provides a fundamental mode cutoff is combined with a traditional double-clad design to generate a cladding-pumped Yb fiber that will also provide cascaded Raman scattering as described herein.

In some experiments with systems in which high-power Yb lasers were used to pump cascaded Raman resonators, the Yb laser high reflector was found to be a weak link in the system, possibly due to the high power that propagates through it. Such systems have been observed to fail under various conditions, such as using those systems to pump an erbium-doped fiber amplifier. Thus, in some circumstances, it may be advantageous to use a MOPA configuration in which a low-power oscillator is used that can be isolated from the power amplifier. According to a further aspect of the invention, the functions of power amplification and cascaded Raman lasing take place within the same cavity.

Figure 6A:
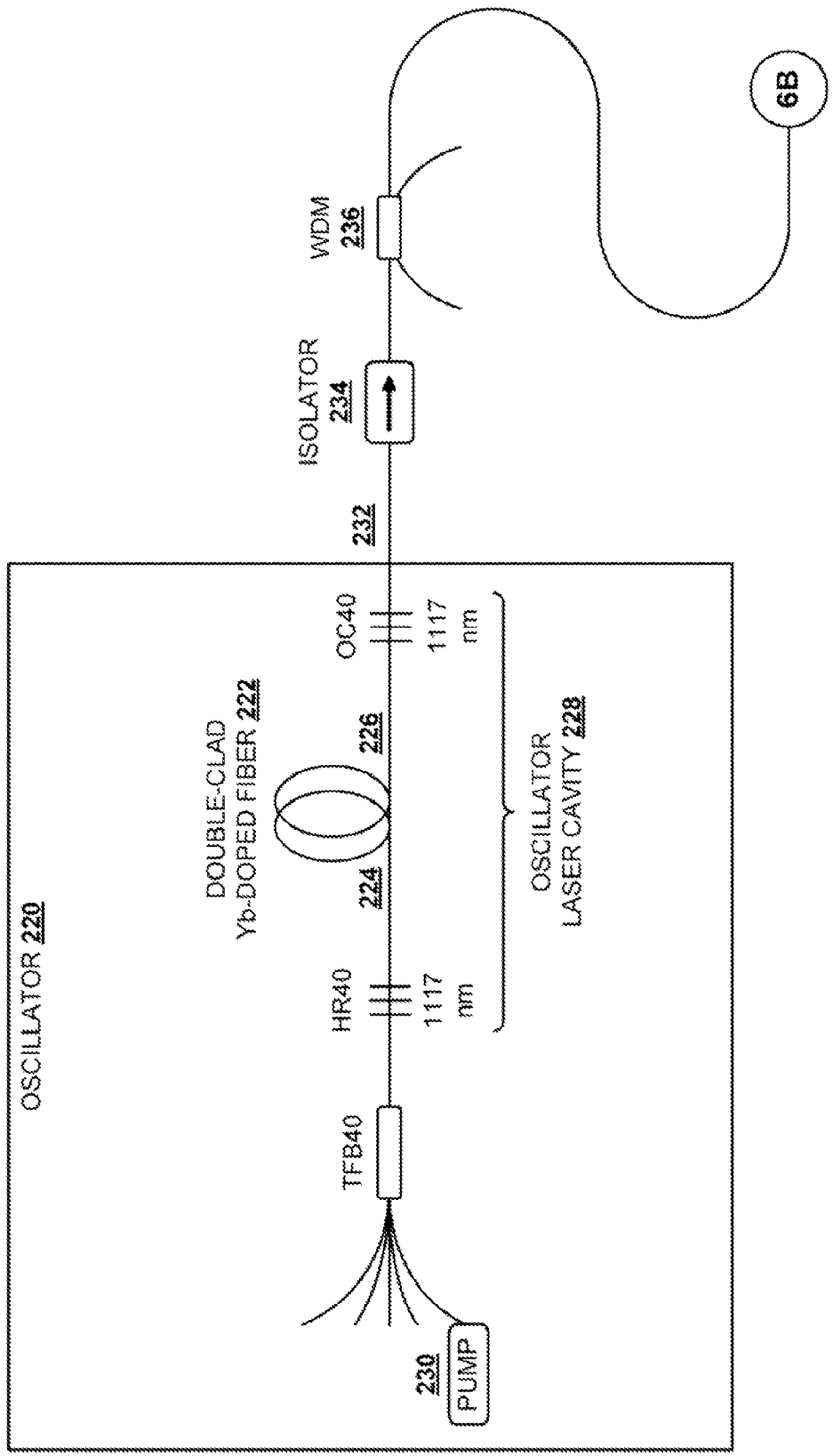
FIGS. 6A and 6B are diagrams illustrating an exemplary master oscillator power amplifier configuration for a cascaded Raman resonator according to a further aspect of the invention.
Figure 6B:
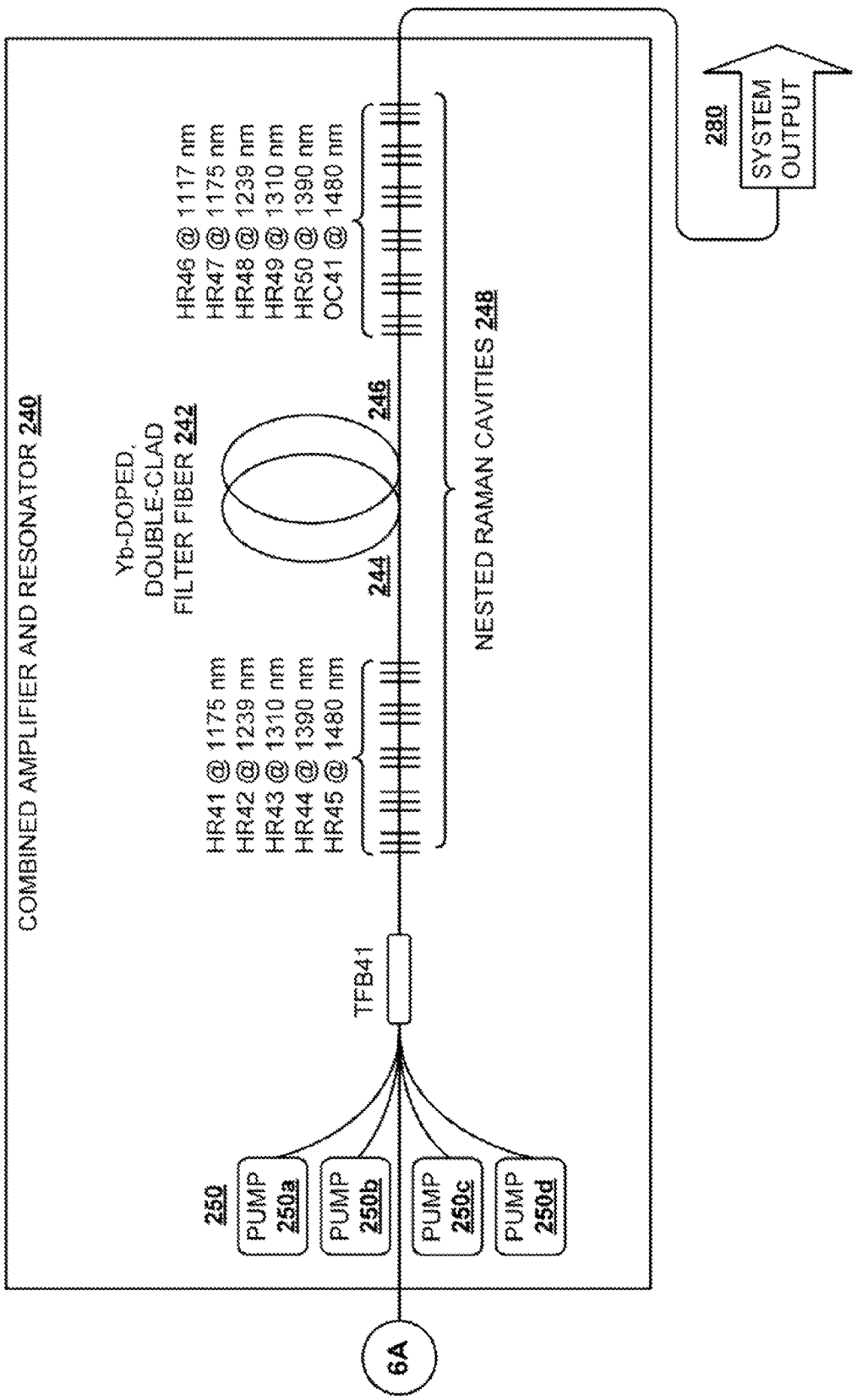

FIGS. 6A and 6B are diagrams illustrating an exemplary MOPA-based system 200 according to this further aspect of the invention. The system 200 comprises two stages operating at two different power ranges: a low-power oscillator 220 (FIG. 6A) and a high-power, single-cavity power amplifier and cascaded Raman resonator 240 (FIG. 6B). Oscillator 220 and combined amplifier and cascaded Raman resonator 240 are isolated from each other by optical isolator 234 (FIG. 6A) and wavelength division multiplexer 236 (FIG. 6A).

Oscillator 220 (FIG. 6A) comprises a length of a laser-active double-clad Yb-doped fiber 222, or other fiber capable of providing a suitable gain medium. A high reflector HR40 and an output coupler OC40 are located, respectively, at the input end 224 and output end 226 of fiber 222. High reflector HR40, output coupler OC40, and fiber 222, provide a laser cavity 228. A pump 230, such as a diode laser or other suitable pump power source, launches a pump power input into fiber 222. Pump 230 is coupled to fiber 222 by means of a tapered fiber bundle TFB40, or like device. In the present example, oscillator 220 provides a laser output 232 of approximately 15 W at 1117 nm. At this relatively low power level, there are minimal reliability issues with respect to high reflector HR40.

The oscillator output 232 is fed through the optical isolator 234 and the wavelength division multiplexer 236 and is provided as an input into the combined power amplifier and cascaded Raman resonator 240.

Combined power amplifier and cascaded Raman resonator 240 (FIG. 6B) is fabricated from a length of a Yb-doped double-clad filter fiber 242, such as the filter fiber 102 discussed above with respect to the FIG. 2 system 100. As discussed above, filter fiber 242 is suitable as a gain medium both for power amplification of the oscillator output 232 and for Raman lasing. A first plurality of high reflectors HR41-HR45 are provided at fiber input 244, and a second plurality of high reflectors HR46-HR50 and an output coupler OC41 are provided at fiber output 246. Input reflectors HR41-HR45, output reflectors HR46-HR50, output coupler OC41, and fiber 242 define therebetween a nested series of laser cavities 248 at selected wavelengths. It will be appreciated that input reflectors HR41-HR45 could equally well be located before TFB41, such that TFB41 is internal to the nested resonators.

A pump source 250 provides a pump power input into filter fiber 242 for power amplification of the oscillator output 230. In FIG. 6B, pump source 250 is depicted as a plurality of pumping devices 250a-d, such as diode lasers and the like. Pumping devices 250 are coupled to filter fiber 242 by means of a tapered fiber bundle TFB41 or other suitable device.

Oscillator output 232 is amplified by pump source 250 through ionic gain in doped filter fiber 242 to a power level that allows Raman scattering to occur within filter fiber 242. As discussed above, in this particular filter fiber 242, the first Stokes shift increases the wavelength of the propagating light to 1175 nm. A high reflector HR46 is provided to reflect back any unscattered light at 1117 nm. In the depicted configuration 200, there is no input high reflector at 1117 nm, in order to allow the 1117 nm radiation to enter the Raman cavity.

High reflectors HR41-HR50 and output coupler OC41 form a nested series of wavelength-matched pairs, each pair in the series being separated from the previous pair by respective Stokes shifts. Raman lasing takes place between each pair in the series, resulting in a cascaded, stepwise transition from the oscillator output wavelength, i.e., 1117 nm, to the target wavelength, i.e., 1480 nm. Coupling to the output wavelength is provided by high reflector HR45 and output coupler OC41. Filter fiber 242 provides fundamental-mode cutoff of wavelengths longer than the target wavelength, thereby preventing undesirable higher-order Stokes shifts.

Isolator 234 prevents backward propagating light from amplifier and resonator 240 from reaching the oscillator 220 and disturbing its operation. Isolator 234 protects oscillator 220 from backward propagating light at all wavelengths within the isolator bandwidth, including wavelengths similar to that of the oscillator output 232. A wavelength-dependent loss element, i.e., WDM 236, prevents backward propagating Stokes radiation from reaching the oscillator 220.

In a further practice of the invention, a light generation and amplification system comprises an actively doped Raman filter fiber, where the loss increases at a wavelength more than two Stokes shifts away from the peak ionic gain wavelength. Actively doped filter fibers to date generally try to filter out Raman gain that is a single Stokes shift away from the signal wavelength. According to this practice of the invention, a novel fiber is used that adds distributed loss multiple Stokes shifts away from the signal, a much large wavelength shift between signal and loss than has been previously considered. Thus, not only is the cavity geometry that uses the fiber novel, but the fiber itself is novel as well.

Figure 7:
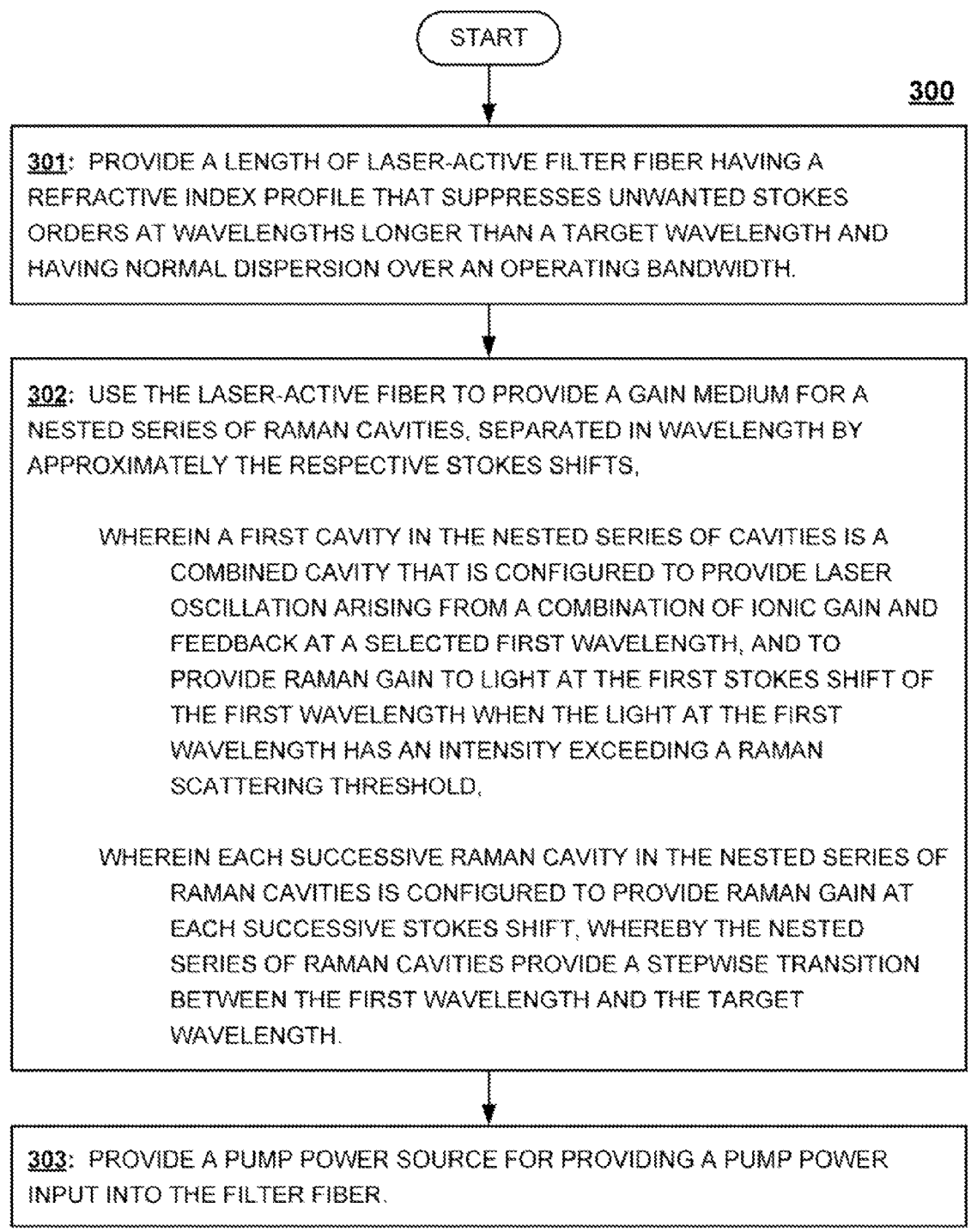
Figure 8A:
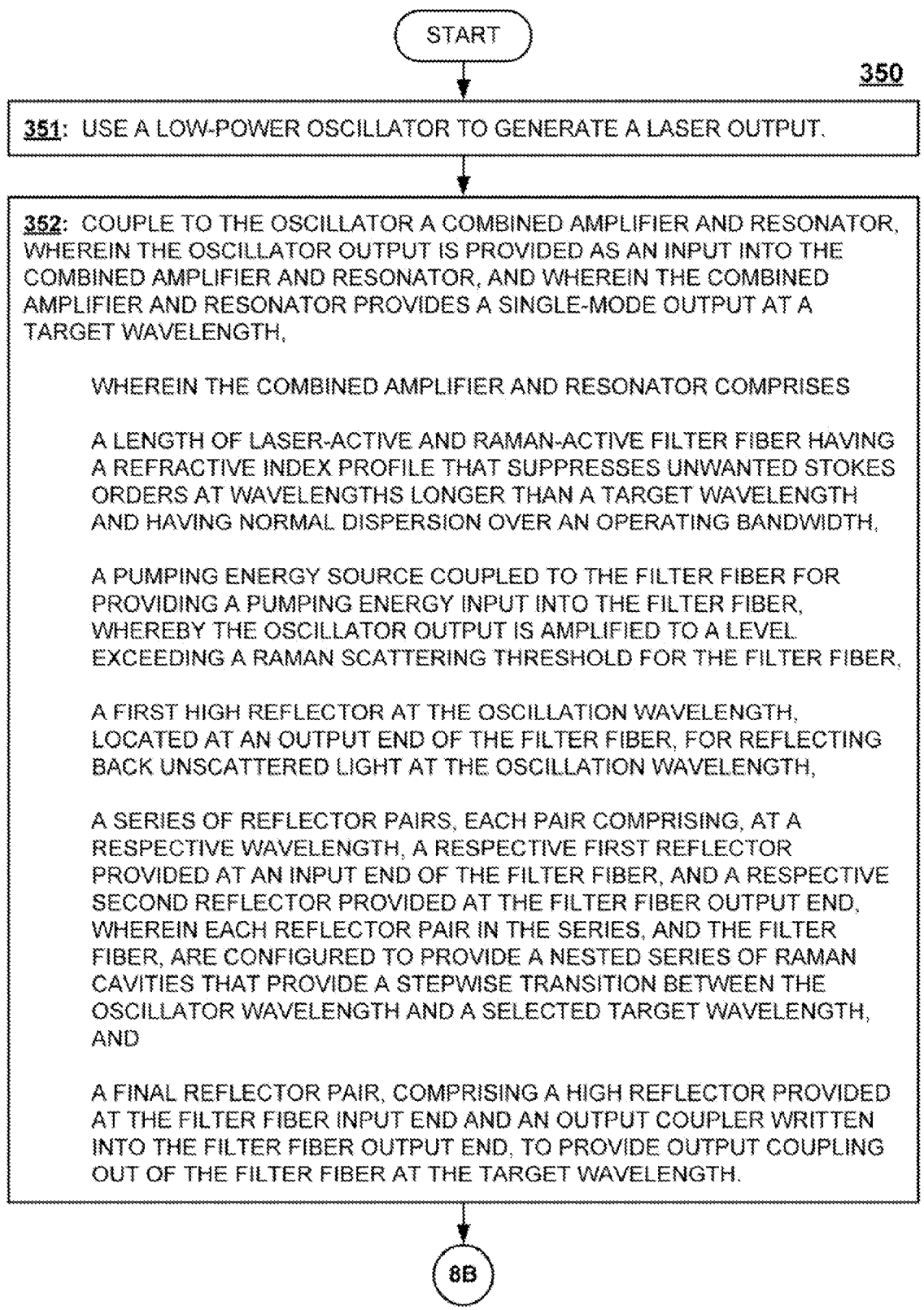

FIGS. 7 and 8A-B are a pair of flowcharts 300 and 350 illustrating overall techniques according to various aspects of the invention described above. It will be appreciated that flowcharts 300 and 350 are intended to be illustrative, rather than limiting. In particular, it should be noted that some or all of the listed method components may, within the scope and spirit of the present invention, be ordered differently, combined with each other or with other non-listed components, or broken down into subcomponents. In addition, not all noted components need be executed.

The technique illustrated in the FIG. 7 flowchart 300 includes the following components:

Box 301:

Provide a length of laser-active filter fiber having a refractive index profile that suppresses unwanted Stokes orders at wavelengths longer than a target wavelength and having normal dispersion over an operating bandwidth.

Box 302:

Use the laser-active fiber to provide a gain medium for a nested series of Raman cavities, separated in wavelength by approximately the respective Stokes shifts, wherein a first cavity in the nested series of cavities is a combined cavity that is configured to provide laser oscillation arising from a combination of ionic gain and feedback at a selected first wavelength, and to provide Raman gain to light at the first Stokes shift of the first wavelength when the light at the first wavelength has an intensity exceeding a Raman scattering threshold, wherein each successive Raman cavity in the nested series of Raman cavities is configured to provide Raman gain at each successive Stokes shift, whereby the nested series of Raman cavities provide a stepwise transition between the first wavelength and the target wavelength.

Box 303:

Provide a pump power source for providing a pump power input into the filter fiber.

The technique illustrated in the FIG. 8A-B flowchart 350 includes the following components:

Box 351:

Use a low-power oscillator to generate a laser output.

Box 352:

Couple to the oscillator a combined amplifier and resonator, wherein the oscillator output is provided as an input into the combined amplifier and resonator, and, wherein the combined amplifier and resonator provides a single-mode output at a target wavelength, wherein the combined amplifier and resonator comprises a length of laser-active and Raman-active filter fiber having a refractive index profile that suppresses unwanted Stokes orders at wavelengths longer than a target wavelength and having normal dispersion over an operating bandwidth, a pump power source coupled to the filter fiber for providing a pump power input into the filter fiber, whereby the oscillator output is amplified to a level exceeding a Raman scattering threshold for the filter fiber, a first high reflector at the oscillation wavelength, located at an output end of the filter fiber, for reflecting back unscattered light at the oscillation wavelength, a series of reflector pairs, each pair comprising, at a respective wavelength, a respective first reflector provided at an input end of the filter fiber, and a respective second reflector provided at the filter fiber output end, wherein each reflector pair in the series, and the filter fiber, are configured to provide a nested series of Raman cavities that provide a stepwise transition between the oscillator wavelength and the target wavelength, and a final reflector pair, comprising a high reflector provided at the filter fiber input end and an output coupler written into the filter fiber output end, to provide output coupling out of the filter fiber at the target wavelength.

Box 353:

Connect a backward propagation prevention device between the oscillator and amplifier, whereby the oscillator is optically isolated from the amplifier and resonator, and whereby the oscillator is operable within a first power level range, and the amplifier and oscillator are operable within a second power level range exceeding the first power level range.

Box 354:

Use the filter fiber and the pump power source to amplify the oscillator output and to create a laser output at the target wavelength.

It is noted that the Raman gain bandwidth is quite large and that the reflectors can be positioned anywhere within the gain bandwidth, not necessarily at the peak of the gain.

The above described systems and techniques are applicable in a number of other contexts including, but not limited to: both linear and ring Raman resonators; a Raman amplifier architecture; a double-pump system including a second pump that is non-resonant with any of the Raman cavities, but that is still within the Raman gain bandwidth; hitting a frequency-doubling crystal, for which a polarized output with a narrow linewidth is beneficial; pulsed or modulated operation, as used for example in a parametric system; and the like.

With respect to Raman amplifiers, it is noted that their architectures are typically similar to those of Raman lasers, except that the amplifier Raman cavity is constructed without the last Stokes shift and output coupler. Also, a seed laser is coupled into the Raman cavity at the last Stokes shift. The seed input from the seed source can be injected into the amplifier at different locations. The seed laser controls a number of amplifier properties, such as polarized output, narrow linewidth, tunability, and the like.

Section II

As mentioned above, cascaded Raman fiber lasers are versatile light sources that can operate at wavelengths at which rare-earth doped fiber lasers are unavailable. Applications include low-quantum-defect, high-power pump sources for large mode area erbium fiber lasers, pump sources for distributed gain in telecom systems, high-power 1240 nm lasers, and sources of high power radiation for frequency doubling in laser guide stars.

The present section is directed to low-power Raman fiber laser designs that are suitable, for example, for a gigabit passive optical network (GPON) application. Because of their complexity, prior art Raman fiber lasers have typically been too costly for use in GPON applications, where price is a key consideration.

The Raman fiber lasers described in this section achieve significant cost savings by employing designs that reduce complexity, assembly time, and component count. In the following designs, the functions of the Yb laser and Raman cavity are combined into a single cavity. This integration results in a substantial simplification of the CRR architecture and consequently a significant reduction in the number of fiber types, grating sets, splices, and the like, thereby lowering costs.

There are at least two significant differences between the Raman fiber lasers described in Section I and in Section II:

First, the Section I Raman fiber laser designs are intended for use at higher powers (e.g., greater than 20 W), and thus require a filtering function. The Section II Raman fiber laser designs are intended for use at lower powers (e.g., less than 10 W), at which a filtering function is typically not required.

Accordingly, the Section I designs are implemented using a fiber of the type described in U.S. patent application Ser. No. 12/778,025, of which the present application is a continuation-in-part, and in U.S. Prov. Patent. App. Ser. No. 61/177,058, from which U.S. patent application Ser. No. 12/778,025 claims priority. The described fiber is configured to provide a filtering function. In particular, the described fiber has a W-shaped refractive index profile, and is configured to provide distributed filtering of long wavelengths, for example, with a W-shaped design. Such a filtering function is not required in the designs described in Section II, but may be desirable in certain applications.

A second significant difference is that a low-power all-in-one Raman fiber laser design must take into account the length of fiber required for the Raman component. In order to achieve sufficient Raman gain at a low power, this length is typically in the hundreds of meters. A low-power Yb fiber laser, on the other hand, is ordinarily implemented using a Yb fiber segment having a length in the tens of meters. Thus, a low-power all-in-one design must address the critical issue of how to implement the Yb laser component, with sufficiently low background loss, using a fiber having a significantly greater length.

Figure 9:
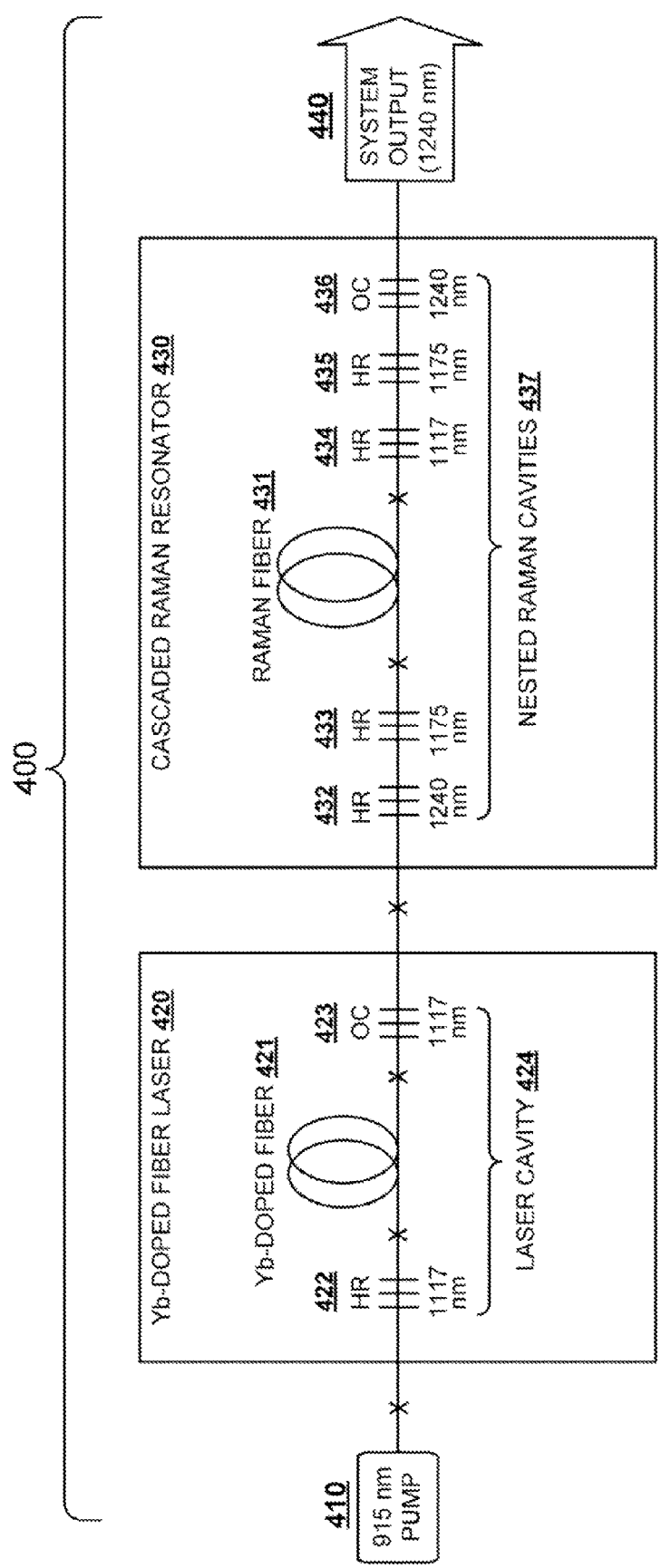
FIG. 9 is a schematic diagram of an exemplary low-power Raman fiber laser system according to the prior art.

FIG. 9 shows a diagram of a 1240 nm Raman fiber laser configuration 400 according to the prior art, comprising a 915 nm pump light input 410, a Yb fiber laser 420 followed by a cascaded Raman resonator (CRR) 430 that generates a 1240 nm output, shown at 440.

In the present example, the Yb-doped fiber laser 420 operates in the 1 μm to 1.1 μm wavelength range, and comprises a segment of Yb-doped fiber 421, an input grating 422 configured as a 1117 nm high reflector and an output grating 423 configured as an 1117 nm output coupler. Gratings 422 and 423 and Yb-doped fiber 421 form a laser cavity 424. The pump power is increased until sufficient gain is achieved to overcome the laser cavity 420 losses and lasing action is achieved. The laser radiation exits the laser cavity 424 through output coupler 423. Light exiting output coupler 423 is then provided as an input into the cascaded Raman resonator 430.

Resonator 430 comprises a segment of Raman fiber 431 having a length of a few hundred meters, a pair of input gratings 432 and 433, and three output gratings 434, 435, and 436 that together form a series of nested Raman cavities configured to create a cascaded series of Stokes shifts to convert an input wavelength (e.g., 1117 nm) into a selected output wavelength (e.g., 1240 nm). Grating 434 is configured as a high reflector at 1117 nm that reflects the input provided by Yb-doped fiber laser 420 back into the Raman fiber 431 in order to recycle the pump light or power and provide additional gain at 1175 nm. As a result of the first Stokes shift, the wavelength of the 1117 nm input is increased to 1175 nm, which is reflected back and forth between HR gratings 433 and 435 until a second Stokes shift increases its wavelength to 1240 nm. Light at 1240 nm is reflected back and forth between HR grating 432 and OC grating 436 until it attains sufficient energy to exit OC grating 436, as a 1240 nm output (440).

In the depicted example, the gratings are implemented using fiber Bragg gratings. As mentioned above, the use of multiple fiber types and grating sets creates complexity and increases the cost of making such lasers.

Figure 10:
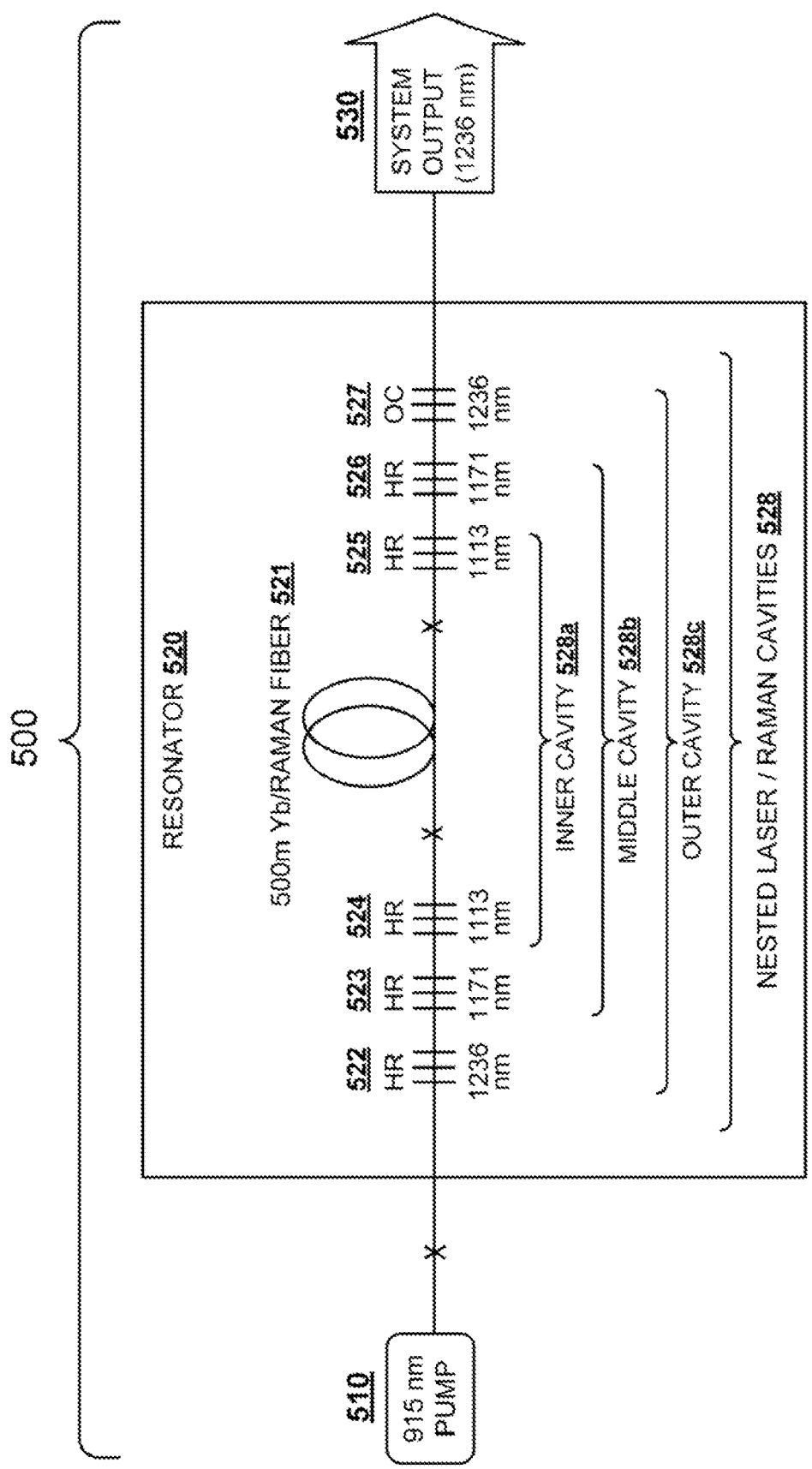
FIG. 10 is a schematic diagram of an "all-in-one" low-power Raman fiber laser system according to an aspect of the invention.

FIG. 10 shows a diagram of an example of an all-in-one Yb/Raman fiber laser system 500 according to an aspect of the present invention. In this exemplary embodiment, system 500 is configured to receive a 915 nm pump light input from a pump source 510 and generate a 1236 nm output 530. It is noted that in exemplary system, the wavelengths are slightly shifted from the corresponding values in the prior art system 400 shown in FIG. 9, including a downward shift in the output wavelength from 1240 nm target to 1236 nm. These shifts do not have a significant impact on performance. It is also noted that wavelengths other than 915 nm could be used for the pump source.

The heart of system 500 is resonator 520, which includes both a Yb-fiber laser component that provides ionic gain, and a Raman laser component that provides Raman gain. Resonator 520 is fabricated from a length of an integrated Yb/Raman fiber 521, and a grating set 522-527. In the depicted system, Yb/Raman fiber 521 has a length of 500 m.

Grating set 522-527 includes a plurality of "input gratings" 522-524 that are positioned at the input end of Yb/Raman fiber, and a plurality of "output gratings," 525-527 that are positioned at the output end of Yb/Raman fiber 521. In the depicted system 500, the grating set 522-527 is implemented using low-index coated fiber Bragg gratings.

Gratings 522-527 are configured to provide three wavelength-matched reflector pairs: 524/525 (1113 nm); 523/526 (1171 nm); and 522/527 (1236 nm). Gratings 522-526 are configured as high reflectors (HiRs). Grating 527 is configured as an output coupler (OC) (i.e., a partial reflector).

In the Yb-laser component of system 500, the stimulation of the Yb dopant ions by a 915 nm pump input produces an output wavelength of 1113 nm. The 1113 nm Yb-laser output provides the input for the Raman component of system 500.

Thus, the first reflector pair 524/525 is configured for operation at 1113 nm. The second reflector pair 523/256 and the third reflector pair 522/527 are configured for operation, respectively, at the first and second Raman-shifted wavelengths: 1171 nm and 1236 nm.

The three reflector pairs and the integrated Yb/Raman fiber 521 form three nested cavities 528: an inner cavity 528a; a middle cavity 528b, and an outer cavity 528c. The 980 nm pump input is subjected to both ionic gain and Raman gain, resulting in a stepwise series of wavelength shifts, ending with a shift to the desired target output wavelength, 1236 nm.

In operation, the Yb-laser component of system 500 receives a 915 nm pump input from pump source 510. As a result of ionic gain, the Yb-laser component provides a 1113 nm output, which is the input to the Raman component of system 500.

The 1113 nm Raman input is reflected back and forth in the inner cavity 528a and undergoes a first Raman shift, to 1171 nm.

Light at 1171 nm is reflected back and forth in the middle cavity 528b and undergoes a second Raman shift, to 1236 nm, i.e., the target wavelength.

Light at 1236 nm is reflected back and forth in the outer cavity 528c until it reaches an energy level that is sufficient to allow it to exit the resonator through the output coupler (OC) provided by grating 527.

As mentioned above, one of the primary challenges in an architecture of the type shown in FIG. 10 is the different length scale that is ordinarily used for a typical Yb-doped fiber laser (i.e., tens of meters) compared to a length scale for a typical Raman resonator (i.e., hundreds of meters). Consequently, low doping levels are required for the Yb-fiber. Further, background loss is a significant issue for a rare-earth-doped gain fiber of this length.

According to an aspect of the invention, an all-in-one Yb/Raman fiber is fabricated to have the following characteristics:
 (1) a relatively low Yb concentration (e.g., ~35 dBm);
 (2) a relatively narrow outer diameter (e.g., ~80 µm) to increase the clad absorption; and
 (3) an all-normal dispersion characteristic to prevent supercontinuum formation.

The exemplary fiber design described in this section does not include a filtering aspect, because it is intended for use with GPONs, or other applications having a relatively low operating power. Providing a fiber with filtering capability requires unique index profile features that have not been incorporated into the present design. It should be noted that a Yb/Raman fiber according to the invention could be designed with the above three characteristics as well as with the filtering characteristics to allow the application of the described laser design for higher power operations.

By decreasing the core absorption (e.g., from 50 dB/m to 35 dB/m at 915 nm), it is possible to achieve a significant reduction in fiber background loss (e.g., >1 dB at 1300 nm).

A typical 125 µm diameter fiber with 35 dB/m core absorption has a clad absorption of 0.035 dB/m. By decreasing the outer fiber diameter to 80 µm, it is possible to increase the clad absorption to 0.087 dB/m, allowing for 26 dB of pump absorption in 300 m of fiber.

Figure 11B:
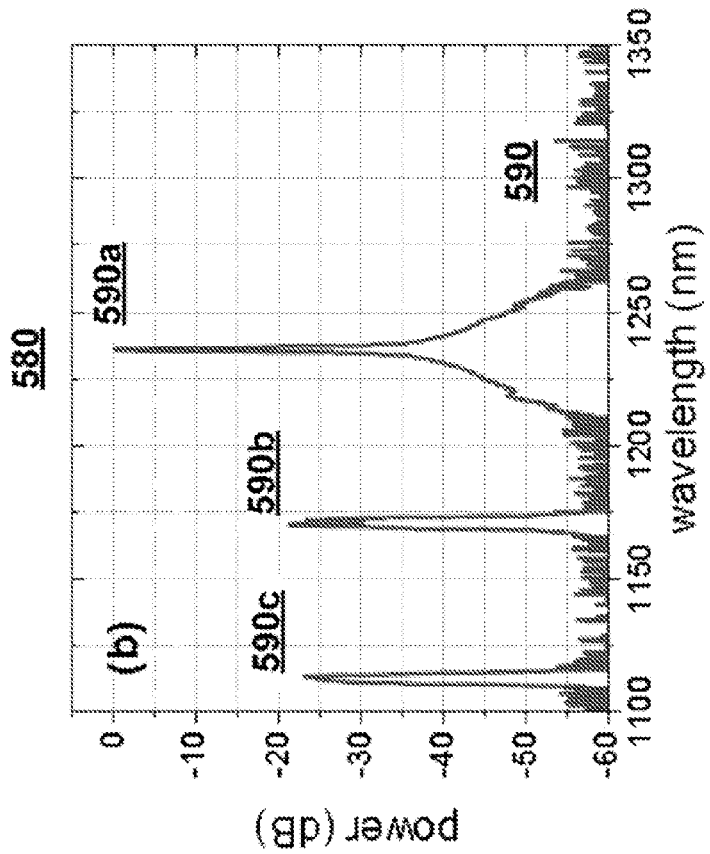
FIGS. 11A and 11B are a pair of graphs setting forth results of tests performed on the low-power Raman fiber laser system shown in FIG. 10.
Figure 11A:
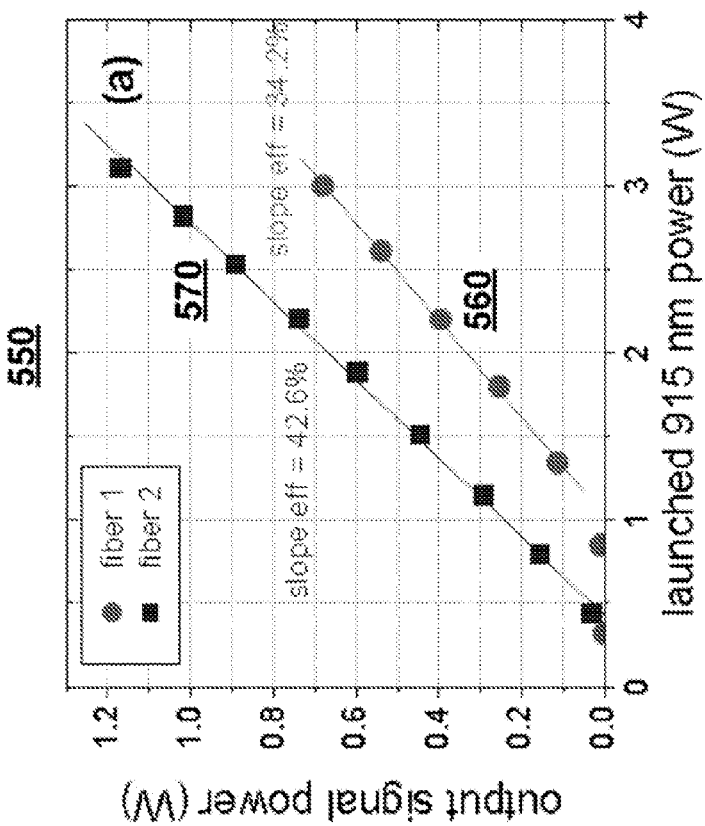

FIGS. 11A and 11B are graphs setting forth the results of tests comparing an all-in-one Yb/Raman fiber laser system using an integrated Yb/Raman fiber incorporating the above-described design features and the same all-in-one Yb/Raman fiber laser system employing a control fiber. Both fibers were low-index coated for cladding pumping.

Fiber 1, the control fiber, had 50 dB/m core absorption and 0.052 dB/m cladding absorption. The background loss of Fiber 1 at 1240 nm was 2.6 dB/km; Fiber 1 had an outer diameter of 125 µm.

Fiber 2, the test fiber, had reduced core absorption of 35 dB/m and also lower background loss of 1.56 dB/km at 1240 nm. The outer diameter of Fiber 2 was reduced to 80 µm, and consequently a higher cladding absorption of 0.087 dB/m, was obtained. A 125 µm-to-80 µm pump taper was added to the pump laser to accommodate the 80 µm outer diameter of Fiber 2.

FIG. 11A is a graph 550 showing the relationship between output signal power at 1240 nm as a function of launched 915 nm power for both Fiber 1 (plot 560) and Fiber 2 (plot 570). The data points for Fiber 1 are indicated by circles, and the data points for Fiber 2 are indicated by squares. The slope of the straight lines fitted to the data points provides a quantification of the efficiency of each fiber in converting the 915 nm input into a 1240 nm output.

The slope efficiency of Fiber 1 is 34.2%, which is substantially lower than the 42.6% slope efficiency obtained from Fiber 2. This greater efficiency results from the lower doping level and lower background loss of Fiber 2. Fiber 2 demonstrated a maximum 1240 nm output signal power of 1.17 W for 3.11 W of 915 nm pump input power.

FIG. 11B is a graph 580 showing the output spectrum for Fiber 2 at a maximum output power 1.17 W. As indicated by peak 590*a*, most of the output is concentrated around 1240 nm, the output wavelength. As indicated by peaks 590*b* and 590*c*, output power is concentrated in smaller amounts at 1171 nm and 1113 nm, i.e., at the preceding Stokes shifts.

The depicted fiber design demonstrates the viability of an all-in-one Yb/Raman fiber laser system. The described approach results in a substantially simpler laser cavity than a typical configuration according to the prior art. Based on a 70% slope efficiency of an exemplary Yb fiber laser and an 87% efficiency per Raman cascade, a typical 1240 nm Raman fiber laser is expected to have a slope efficiency of approximately 52%. It is anticipated that, with further optimization of fiber length and background loss, it will be possible to approach that value with an all-in-one Yb/Raman design according to the present invention.

Figure 12:
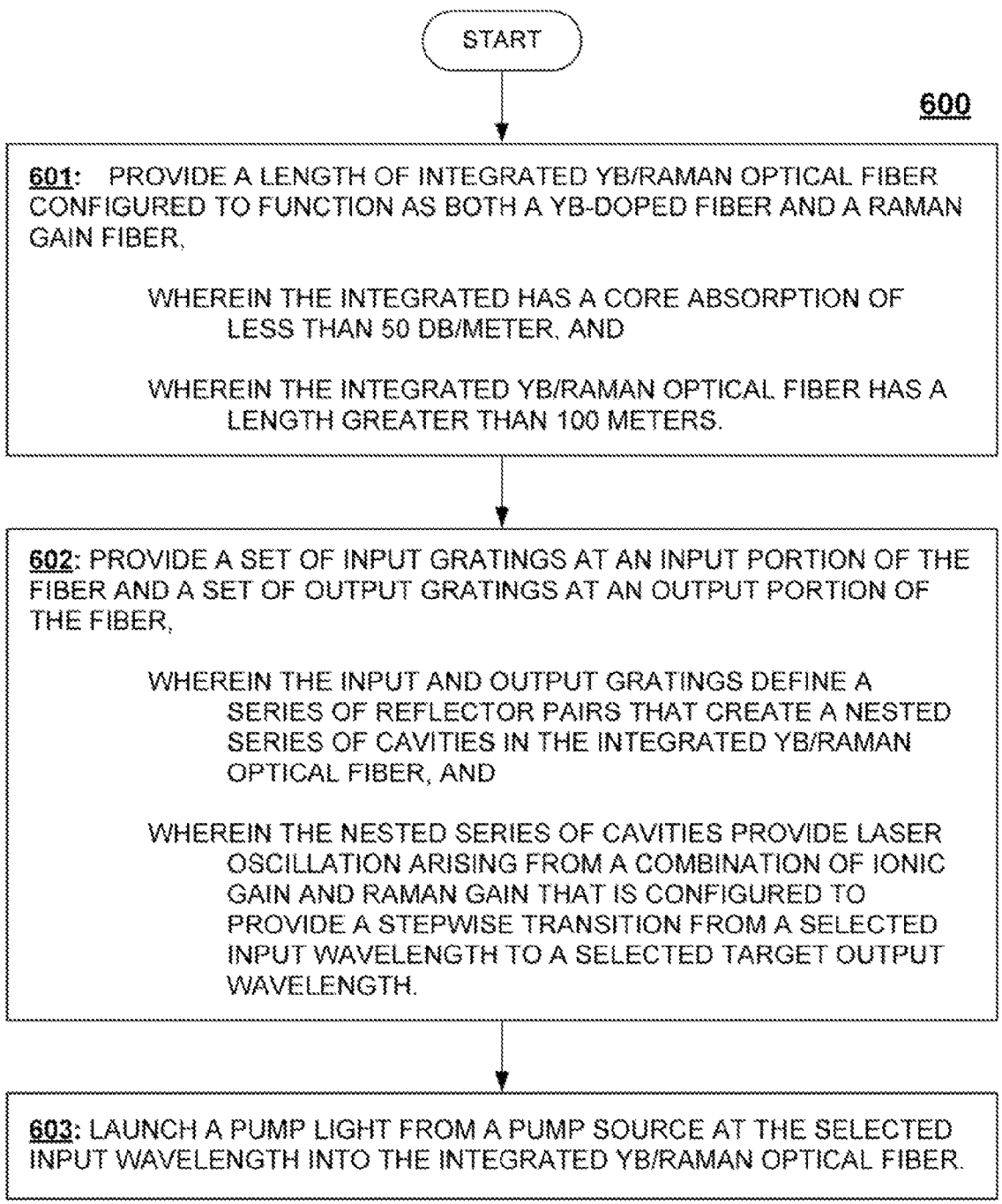
FIG. 12 is a flowchart of a general technique for using an integrated Yb/Raman optical fiber to provide low-power light generation and amplification.

FIG. 12 shows a flowchart of a light generation and amplification technique 600 according to an aspect of the invention.

It should be noted that FIG. 12 is intended to be exemplary, rather than limiting. The present invention may be practiced in a number of different ways, using different combinations of some or all of the elements set forth in these drawings, as well as combinations including elements not explicitly set forth in these drawings. Further, the enumerated steps may be performed in a different order, or contemporaneously.

Technique 600 comprises the following steps:

601: Provide a length of integrated Yb/Raman optical fiber configured to function as both a Yb-doped fiber and a Raman gain fiber,
wherein the integrated has a core absorption of less than 50 dB/meter, and
wherein the integrated Yb/Raman optical fiber has a length greater than 100 meters.

It should be noted that the length of "100 meters" is not meant to be a strict limitation, but is chosen merely as an example to show that the length will be longer a length used in an ordinary low-power Yb fiber laser, that is, a Yb fiber segment having a length in the tens of meters.

602: Provide a set of input gratings at an input portion of the fiber and a set of output gratings at an output portion of the fiber, wherein the input and output gratings define a series of reflector pairs that create a nested series of cavities in the integrated Yb/Raman optical fiber, and wherein the nested series of cavities provide laser oscillation arising from a combination of ionic gain and Raman gain that is configured to provide a stepwise transition from a selected input wavelength to a selected target output wavelength.

603: Launch a pump light from a pump source at the selected input wavelength into the integrated Yb/Raman optical fiber.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. An integrated Yb/Raman optical fiber laser configuration, comprising:
   a resonator comprising a length of integrated Yb/Raman optical fiber configured to function as both a Yb-doped fiber laser and a Raman gain fiber,
      wherein the integrated optical fiber has a set of input gratings at an input portion of the fiber and a set of output gratings at an output portion of the fiber,
      wherein the sets of input and output gratings define a series of reflector pairs that create a nested series of cavities within the integrated Yb/Raman optical fiber,
      wherein the nested series of cavities provide laser oscillation allowing for a stepwise transition from an input wavelength to a selected target output wavelength, and
      wherein the integrated Yb/Raman fiber has an outside diameter that is less than 125 μm.

2. The laser configuration of claim 1, wherein respective wavelengths of the series of reflector pairs are separated from each other by respective Stokes shifts and, wherein the series of reflector pairs are configured to provide Raman gain at each successive Stokes shift.

3. The laser configuration of claim 2, wherein the integrated Yb/Raman fiber has all normal dispersion, to prevent supercontinuum formation.

4. The laser configuration of claim 3,
   wherein the Yb concentration of the integrated Yb/Raman fiber is approximately 35 dB/m, and
   wherein the fiber has an outside diameter of approximately 80 μm, thereby providing a cladding absorption of approximately 0.087 dB/m.

5. The laser configuration of claim 2, further including a pump source to provide the input wavelength.

6. The laser configuration of claim 5, wherein the pump source comprises a multi-mode diode laser.

7. The laser configuration of claim 6, wherein the multi-mode diode laser is spliced directly to the set of input gratings.

8. The laser configuration of claim 7, wherein the set of input gratings comprises a low-index coated grating set.

9. The laser configuration of claim 8, wherein the multi-mode diode laser comprises a pump taper element to geometrically adapt the multi-mode diode laser to a reduced outside diameter of the integrated Yb/Raman fiber.

10. The laser configuration of claim 9, wherein the target output wavelength is approximately 1240 nm.

11. A light generation and amplification method, comprising:
    providing a length of integrated Yb/Raman optical fiber configured to function as both a Yb-doped fiber and a Raman gain fiber,
       wherein the integrated Yb/Raman fiber has an outside diameter that is less than 125 μm, and
       wherein the integrated optical fiber has a set of input gratings at an input portion of the fiber and a set of output gratings at an output portion of the fiber,
       wherein the sets of input and output gratings define a series of reflector pairs that create a nested series of cavities within the integrated Yb/Raman optical fiber,
       wherein the nested series of cavities provide laser oscillation allowing for a stepwise transition from an input wavelength to a selected target output wavelength; and
    launching a pump light from a pump source at the input wavelength into the integrated Yb/Raman optical fiber.

12. The method of claim 11, wherein respective wavelengths of the series of reflector pairs are separated from each other by respective Stokes shifts and, wherein the series of reflector pairs are configured to provide Raman gain at each successive Stokes shift.

13. The method of claim 12, wherein the integrated Yb/Raman fiber has an all-normal dispersion characteristic, thereby preventing supercontinuum formation.

14. The method of claim 13,
wherein the Yb concentration of the integrated Yb/Raman fiber is approximately 35 dBm, and
wherein the fiber has an outside diameter of approximately 80 μm, thereby providing a cladding absorption of approximately 0.087 dB/m.

15. An integrated Yb/Raman optical fiber configured to function as both a Yb-doped optical fiber lasing medium and a Raman gain fiber, the integrated Yb/Raman fiber being characterized by:
(a) no optical filtering at a first selected wavelength;
(b) a relatively low Yb concentration, with a core absorption of less than 50 dB/meter;
(c) a relatively small outside diameter selected so as to increase cladding absorption;
(d) all normal dispersion, to prevent supercontinuum formation;
(e) a length of greater than 100 meters; and
(f) an outside diameter that is less than 125 μm.

16. The fiber of claim 15,
wherein the integrated Yb/Raman fiber has a Yb concentration of approximately 35 dBm, and
wherein the fiber has an outside diameter of approximately of 80 μm, thereby providing a cladding absorption of approximately 0.087 dB/m.

* * * * *